United States Patent
Perez et al.

(10) Patent No.: US 12,151,374 B2
(45) Date of Patent: Nov. 26, 2024

(54) REACHABLE MANIFOLD AND INVERSE MAPPING TRAINING FOR ROBOTS

(71) Applicant: NAVER CORPORATION, Gyeonggi-do (KR)

(72) Inventors: Julien Perez, Grenoble (FR); Seungsu Kim, Meylan (FR)

(73) Assignee: NAVER CORPORATION, Gyeonggi-Do (KR)

( * ) Notice: Subject to any disclaimer, the term of this patent is extended or adjusted under 35 U.S.C. 154(b) by 387 days.

(21) Appl. No.: 17/487,595

(22) Filed: Sep. 28, 2021

(65) Prior Publication Data

US 2022/0305649 A1  Sep. 29, 2022

Related U.S. Application Data

(60) Provisional application No. 63/165,906, filed on Mar. 25, 2021.

(51) Int. Cl.
| | |
|---|---|
| *B25J 9/16* | (2006.01) |
| *G05B 13/02* | (2006.01) |
| *G06N 3/045* | (2023.01) |
| *G06N 3/047* | (2023.01) |

(52) U.S. Cl.
CPC ............ *B25J 9/1612* (2013.01); *B25J 9/161* (2013.01); *B25J 9/1671* (2013.01); *G05B 13/027* (2013.01); *G06N 3/045* (2023.01); *G06N 3/047* (2023.01)

(58) Field of Classification Search
CPC .......... B25J 9/1612; B25J 9/163; B25J 9/161; G05B 13/027; G06N 3/08
See application file for complete search history.

(56) References Cited

U.S. PATENT DOCUMENTS

| | | | |
|---|---|---|---|
| 10,671,889 B2 * | 6/2020 | Poole | G06V 10/454 |
| 2013/0345865 A1 * | 12/2013 | Iba | B25J 9/163 |
| | | | 700/250 |

(Continued)

OTHER PUBLICATIONS

Nicola De Cao, Block Neural Autoregressive Flow, Apr. 9, 2019, pp. 1-12 (Year: 2019).*

(Continued)

*Primary Examiner* — Jonathan L Sample
*Assistant Examiner* — Mohammed Yousef Abuelhawa

(57) ABSTRACT

A system includes: a first module configured to, based on a set of target robot joint angles, generate a first estimated end effector pose and a first estimated latent variable that is a first intermediate variable between the set of target robot joint angles and the first estimated end effector pose; a second module configured to determine a set of estimated robot joint angles based on the first estimated latent variable and a target end effector pose; a third module configured to determine joint probabilities for the robot based on the first estimated latent variable and the target end effector pose; and a fourth module configured to, based on the set of estimated robot joint angles, determine a second estimated end effector pose and a second estimated latent variable that is a second intermediate variable between the set of estimated robot joint angles and the second estimated end effector pose.

27 Claims, 11 Drawing Sheets

(6 of 11 Drawing Sheet(s) Filed in Color)

(56) References Cited

U.S. PATENT DOCUMENTS

| | | | | |
|---|---|---|---|---|
| 2014/0277741 | A1* | 9/2014 | Kwon | A61B 34/37 |
| | | | | 700/263 |
| 2019/0232488 | A1* | 8/2019 | Levine | G05B 13/027 |
| 2020/0312456 | A1* | 10/2020 | Yadid-Pecht | G16H 80/00 |
| 2022/0134537 | A1* | 5/2022 | Chadalavada Vijay Kumar | ......... |
| | | | | B25J 9/163 |
| | | | | 700/250 |
| 2022/0258336 | A1* | 8/2022 | Okawa | G06N 3/084 |

OTHER PUBLICATIONS

S. Kim and J. Perez: "Learning Reachable Manifold and Inverse Mapping for a Redundant Robot Manipulator;" 2021 IEEE International Conference on Robotics and Automation (ICRA 2021); May 31-Jun. 4, 2021.

A. D'Souza, S. Vijayakumar, S. Schaal; "Learning Inverse Kinematics;" International Conference on Intelligence in Robotics and Autonomous Systems (IROS), 2001.

A. Goldenberg, B. Benhabib, R. Fenton; "A Complete Generalized Solution to the Inverse Kinematics of Robotics;" IEEE Journal of Robotics and Automation, vol. RA-1, No. 1, pp. 14-20, Mar. 1985.

A. Liegeois; "Automatic Supervisory Control of the Configuration and Behavior of Multibody Mechanisms;" IEEE Transactions on Systems, Man, and Cybernetics, pp. 868-871, Dec. 1977.

A. Mousavian, C. Eppner, D. Fox; "6-DOF GraspNet: Variational Grasp Generation for Object Manipulation;" published as an Open Access version by the Computer Vision Foundation, pp. 2901-2910, 2019.

C.-W. Huang, D. Krueger, A. Lacoste, et al.; "Neural Autoregressive Flows;" Proceedings of the 35th International Conference on Machine Learning, 2018.

D. J. Rezende S. Mohamed; "Variational Inference with Normalizing Flows;" Google DeepMind, London; Proceedings of the 32nd International Conference on Machine Learning, 2015.

D. P. Kingma, T. Salimans, R. Jozefowicz, X. Chen, I. Sutskever, and M. Welling, "Improved Variational Inference with Inverse Autoregressive Flow," in Advances in Neural Information Processing Systems 29, D. D. Lee, M. Sugiyama, U. V. Luxburg, I. Guyon, and R. Garnett, Eds. Curran Associates, Inc., 2016, pp. 4743-4751.

F. Zacharias, C. Borst, G. Hirzinger; "Object-Specific Grasp Maps for Use in Planning Manipulation Actions;" published in German Workshop on Robotics Advances in Robotics Research—Theory, Implementation, Application. Springer Verlag, pp. 203-213, Jan. 2009.

F. Zacharias, C. Borst, S. Wolf, et al.; "The Capability Map: A Tool to Analyze Robot Arm Workspaces;" World Scientific Publishing Company; International Journal of Humanoid Robotics, vol. 10, No. 4, pp. 1350031-1-1350031-33, Jan. 27, 2014.

G. Papamakarios, "Neural Density Estimation and Likelihood-free Inference;" University of Edinburgh, School of Informatics, published on arXiv on Oct. 29, 2019 (arXiv reference arXiv: 1910. 13233), Apr. 2019.

H.S. Fang, C. Weng, M. Gou, et al.; "GraspNet-1Billion A Large-Scale Benchmark for General Object Grasping;" Shanghai Jiao Tong University, published by the Computer Vision Foundation, pp. 11444-11453, 2020.

I. Kobyzev, S. Prince, M. Brubaker; "Normalizing Flows: An Introduction and Review of Current Methods;" IEEE Transactions on Pattern Analysis and Machine Intelligence; published on arXiv on Jun. 6, 2020 (arXiv reference arXiv: 1908.09257v4).

J. Lundell, "6-DOF GraspNet Pytorch," https://github.com/jsll/pytorch 6dof-graspnet, 2020.

J. Pan, S. Chitta, D. Manocha; "FCL: A General Purpose Library for Collision and Proximity Queries;" Department of Computer Science, the University of North Carolina, Willow Garage Inc., 2012.

J. Xie, Y. Lu, S. Zhu, et al.; "A Theory of Generative ConvNet;" Department of Statistics, University of California; Proceedings of the 33rd International Conference on Machine Learning, 2016.

J. Zhao, M. Mathieu, Y. LeCun; "Energy-Based Generative Adversarial Networks;" Department of Computer Science, New York University; Facebook Artificial Intelligence Research; published as a conference paper at ICLR, 2017.

K. M. Lynch, F. Park; Preprint of "Modern Robotics Mechanics, Planning, and Control;" published by Cambridge University Press, May 2017.

L. Ardizzone, J.Kruse, S. Wirkert, et al.; "Analyzing Inverse Problems with Invertible Neural Networks"; Published as a conference paper at ICLR, 2019.

L. Pinto, A. Gupta; "Supersizing Self-supervision: Learning to Grasp from 50K Tries and 700 Robot Hours;" The Robotics Institute, Carnegie Mellon University, published on arXiv on Sep. 23, 2015 (arXiv reference arXiv: 1509.06825).

M. Germain, K. Gregor, I. Murray, et al.; "MADE: Masked Autoencoder for Distribution Estimation," Proceedings of the 32nd International Conference on Machine Learning, 2015.

M. Rolf, J. Steil, M. Gienger; "Goal Babbling Permits Direct Learning of Inverse Kinematics;" IEEE Transactions on Autonomous Mental Development, vol. 2, No. 3, pp. 216-229, Sep. 2010.

N. De Cao, W. Aziz, I. Titov; "Block Neural Autoregressive Flow;" University of Edinburgh, University of Amsterdam; published on arXiv on Apr. 9, 2019 (arXiv reference arXiv: 1904,0467).

N. Jaquier, L. Rozo, D. Caldwell, et al.; "Geometry-aware manipulability learning, tracking, and transfer;" The International Journal of Robotics Research, pp. 1-27, 2020.

N. Vahrenkamp, H. Arnst, M. Wachter, et al.; "Workspace Analysis for Planning Human-Robot Interaction Tasks;" European Unions Horizon 2020 Research and Innovation grant agreement No. 643950 (SecondHands), 2016.

O. Porges, R. Lampariello, J. Artigas, et al.; "Reachability and Dexterity: Analysis and Applications for Space Robotics;" German Aerospace Center (DLR), 2015.

S. Kim, A. Coninx, S. Doncieux; "From exploration to control: learning object manipulation skills through novelty search and local adaptation;" published on arXiv on Jan. 3, 2019, (arXiv reference arXiv: 1901.00811).

S. Kim, A. Shukla, A. Billard; "Catching Objects in Flight;" IEEE Transactions on Robotics, vol. 30, No. 5, pp. 1049-1065, Oct. 2014.

S. Kim, R. Haschke, H. Ritter; "Gaussian Mixture Model 3-DoF orientations;" Robotics and Autonomous Systems, vol. 87, pp. 28-37, Jan. 2017.

Y. LeCun, S. Chopra, R. Hadsell, et al.; "A Tutorial on Energy-Based Learning;" The Courant Institute of Mathematical Sciences, New York University, MIT Press, 2006.

Y. Nakamura, H. Hanafusa, T. Yoshikawa; "Task-Priority Based Redundancy Control of Robot Manipulators;" Automation Research Laboratory, Kyoto University, published in the International Journal of Robotics Research, vol. 6, No. 2, pp. 3-15, 1987.

Y. Nakamura; "Advanced Robotics: Redundancy and Optimization;" Addison-Wesley Publishing, 1991.

* cited by examiner

Algorithm 1: Training procedure

Data: $\{x_i, q_i\}_{i=1}^{N}$ from motor babbling while *numer of epoch* do

// train forward and inverse networks $(x, z) = \mathcal{F}(q)$ $q = \mathcal{I}(x, z)$ $(x, z) = \mathcal{F}(q)$ compute $p(x), p(x, z)$ from $\mathcal{D}$ compute losses $\mathcal{L}_q, \mathcal{L}_c$ and $\mathcal{L}_e$ optimizer step for $\mathcal{F}$ and $\mathcal{I}$ // train density network $(x, z) = \mathcal{F}(q)$ compute loss $\mathcal{L}_d$ optimizer step for $\mathcal{D}$ end

FIG. 4

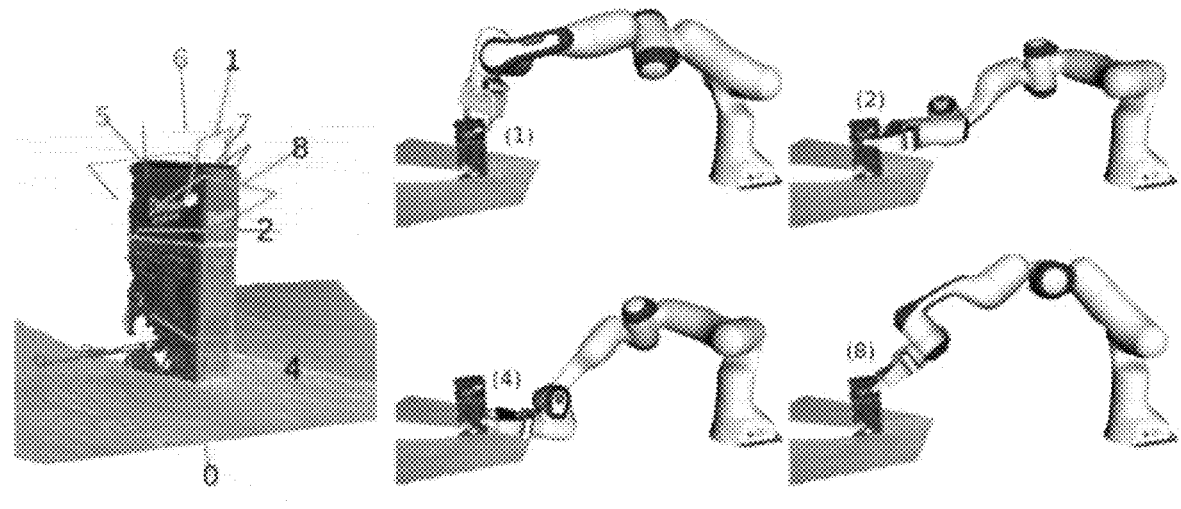
(a) Object position : (0.8, 0.0, 0.0)
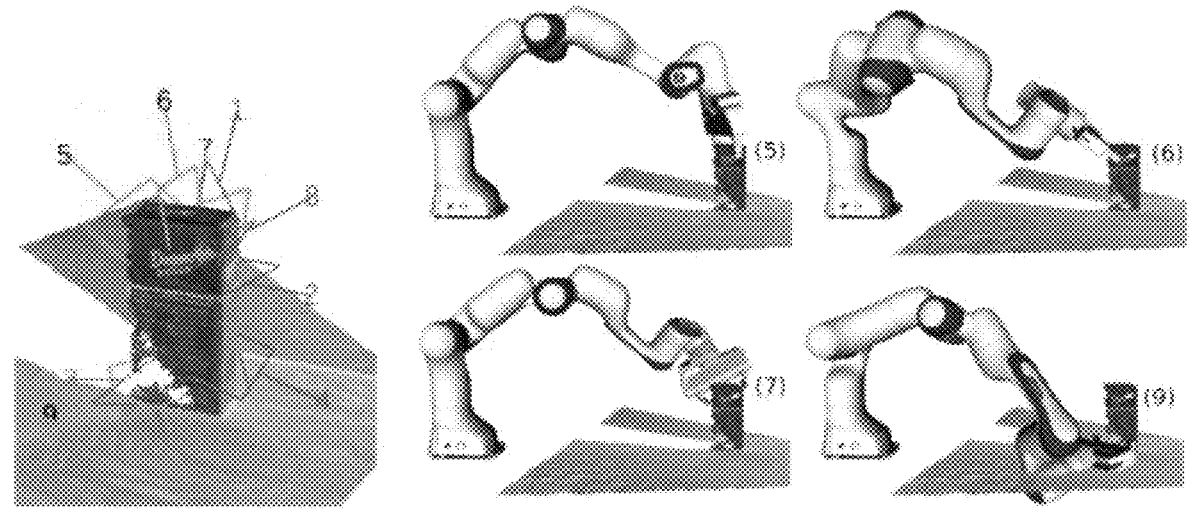
(b) Object position : (-0.8, 0.0, 0.0)
FIG. 9

REACHABLE MANIFOLD AND INVERSE MAPPING TRAINING FOR ROBOTS

CROSS-REFERENCE TO RELATED APPLICATIONS

This application claims the benefit of U.S. Provisional Application No. 63/165,906, filed on Mar. 25, 2021. The entire disclosure of the application referenced above is incorporated herein by reference.

FIELD

The present disclosure relates to robots and more particularly to systems and methods for training robots.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

One challenge for robot motion planning is validating the feasibility of planned robot motions within the robot's constraints, such as kinematic limits, geometric constraints, self-collisions, etc. One challenge in this regard is the time-consuming operations of solving optimization and falling on local minima. Such problems can be even harder for sequential robot motion planning where validation is performed for kinematic and dynamic feasibility for each time step of the planned long-horizon trajectory.

One of the approaches to tackle such an issue is modeling the kinematic feasibility manifold of a robot end-effector offline, and directly querying the feasibility from the model.

SUMMARY

In a feature, a system for training a neural network to control movement of an end effector of a robot is described. The system includes: a first forward network module configured to, based on a set of target robot joint angles, generate a first estimated end effector pose and a first estimated latent variable that is a first intermediate variable between the set of target robot joint angles and the first estimated end effector pose; an inverse network module configured to determine a set of estimated robot joint angles based on (a) the first estimated latent variable and (b) a target end effector pose; a density network module configured to determine joint probabilities for the robot based on (a) the first estimated latent variable and (b) the target end effector pose; and a second forward network module configured to, based on the set of estimated robot joint angles, determine (a) a second estimated end effector pose and (b) a second estimated latent variable that is a second intermediate variable between the set of estimated robot joint angles and the second estimated end effector pose, where the joint probabilities define a reachable manifold of the end effector of the robot, and where the reachable manifold defines whether a set of robot joint angles is kinematically feasible for reaching an end effector pose.

In further features, the first forward network module includes a multilayer neural network.

In further features, the multilayer neural network is fully connected.

In further features, the inverse network module includes a multilayer neural network.

In further features, the multilayer neural network is fully connected.

In further features: the first forward network module includes a first plurality of layers; and the inverse network module includes a second plurality of layers that are arranged inversely to the first plurality of layers.

In further features, the density network module includes an autoregressive flow network.

In further features, the autoregressive flow network includes a block neural autoregressive flow (B-NAF) network.

In further features, the density network determines the joint probabilities using the chain rule of probability.

In further features, a training module is configured to: while maintaining the density network module constant, jointly train the first forward network module, the second forward network module, and the inverse network module; and while maintaining the first forward network module, the second forward network module, and the inverse network module constant, training the density network module.

In further features, the training module is configured to train the first forward network module, the second forward network module, the inverse network module, and the density network module using samples obtained during babbling of the robot.

In further features, the training module is configured to: determine a loss based on the set of target robot joint angles and the set of estimated robot joint angles; and while maintaining the density network module constant, jointly train the first forward network module, the second forward network module, and the inverse network module to minimize the loss.

In further features, the training module is configured to determine the loss using mean squared error.

In further features, the training module is configured to: determine a loss based on (a) the first estimated latent variable, (b) the target end effector pose, (c) the second set of robot joint angles, and (d) the second estimated latent variable; and while maintaining the density network module constant, jointly train the first forward network module, the second forward network module, and the inverse network module to minimize the loss.

In further features, the training module is configured to determine the loss using mean squared error.

In further features, the training module is configured to: determine a loss based on the joint probabilities for the robot; and while maintaining the density network module constant, jointly train the first forward network module, the second forward network module, and the inverse network module to minimize the loss.

In further features, the training module is configured to determine the loss using KL divergence.

In further features, the training module is configured to: determine a first loss based on the set of target robot joint angles and the set of estimated robot joint angles; determine a second loss based on (a) the first estimated latent variable, (b) the target end effector pose, (c) the second set of robot joint angles, and (d) the second estimated latent variable; determine a third loss based on the joint probabilities for the robot; determine a fourth loss based on the first, second, and third losses; and while maintaining the density network module constant, jointly train the first forward network module, the second forward network module, and the inverse network module to minimize the fourth loss.

In further features, the training module is configured to determine the fourth loss based on: (a) a first product of the first loss and a first predetermined weight; (b) a second product of the second loss and a second predetermined weight; and (c) a third product of the third loss and a third predetermined weight.

In further features, the training module is configured to determine the fourth loss based on the first product plus the second product plus the third product.

In further features, the training module is configured to: determine a loss based on the joint probabilities for the robot; and while maintaining the first forward network module, the second forward network module, and the inverse network module constant, training the density module to minimize the loss.

In further features, the training module is configured to determine the loss using KL divergence.

In a feature, a system to control movement of an end effector of a robot is described. The system includes: a latent variable computation module configured to, based on a reachable manifold and a specified end effector pose, determine a computed latent variable that is a first intermediate variable between a set of computed robot joint angles and the specified end effector pose; and a trained inverse network module configured to, based on the specified end effector pose and the computed latent variable, determine the set of computed robot joint angles; where computed joint probabilities define the reachable manifold of the end effector of the robot; and wherein the reachable manifold defines whether the set of computed robot joint angles is kinematically feasible for reaching the specified end effector pose.

In further features, the trained inverse network module is trained by a training system including: a first forward network module configured to, based on a set of target robot joint angles, generate a first estimated end effector pose and a first estimated latent variable that is a second intermediate variable between the set of target robot joint angles and the first estimated end effector pose; a density network module configured to determine joint probabilities for the robot based on (a) the first estimated latent variable and (b) a target end effector pose; and a second forward network module configured to, based on a set of estimated robot joint angles, determine (a) a second estimated end effector pose and (b) a second estimated latent variable that is a third intermediate variable between the set of estimated robot joint angles and the second estimated end effector pose; where during training the inverse network module is configured by the training system to determine the set of estimated robot joint angles based on (a) the first estimated latent variable and (b) the target end effector pose.

In a feature, a system to control movement of an end effector of a robot is disclosed and includes: a control module configured to determine feasibility of a specified end effector pose of the robot when density $p(x)$ or $p(x,z)$ determined using a reachable manifold is greater than a reachability density threshold; wherein the reachable manifold defines whether a set of robot joint angles is kinematically feasible for reaching the specified end effector pose; where the reachable manifold is determined with a training system including: a first forward network module configured to, based on a set of target robot joint angles, generate a first estimated end effector pose and a first estimated latent variable that is a first intermediate variable between the set of target robot joint angles and the first estimated end effector pose; an inverse network module configured to determine a set of estimated robot joint angles based on (a) the first estimated latent variable and (b) a target end effector pose; a density network module configured to determine joint probabilities for the robot based on (a) the first estimated latent variable and (b) the target end effector pose; and a second forward network module configured to, based on the set of estimated robot joint angles, determine (a) a second estimated end effector pose and (b) a second estimated latent variable that is a second intermediate variable between the set of estimated robot joint angles and the second estimated end effector pose; where the joint probabilities define the reachable manifold of the end effector of the robot.

In a feature, a method of training a neural network to control movement of an end effector of a robot is described and includes: based on a set of target robot joint angles, generating a first estimated end effector pose and a first estimated latent variable that is a first intermediate variable between the set of target robot joint angles and the first estimated end effector pose; determining a set of estimated robot joint angles based on (a) the first estimated latent variable and (b) a target end effector pose; determining joint probabilities for the robot based on (a) the first estimated latent variable and (b) the target end effector pose; and based on the set of estimated robot joint angles, determining (a) a second estimated end effector pose and (b) a second estimated latent variable that is a second intermediate variable between the set of estimated robot joint angles and the second estimated end effector pose, where the joint probabilities define a reachable manifold of the end effector of the robot, and where the reachable manifold determines whether a set of robot joint angles is kinematically feasible for reaching an end effector pose.

In a feature, a method of controlling movement of an end effector of a robot is described and includes: based on a reachable manifold and a specified end effector pose, determining a computed latent variable that is a first intermediate variable between a set of computed robot joint angles and the specified end effector pose; and based on the specified end effector pose and the computed latent variable, determining the set of computed robot joint angles, where computed joint probabilities define the reachable manifold of the end effector of the robot, and wherein the reachable manifold defines whether the set of computed robot joint angles is kinematically feasible for reaching the specified end effector pose.

In a feature, a method of controlling movement of an end effector of a robot is described and includes: determining feasibility of a specified end effector pose of the robot when density $p(x)$ or $p(x,z)$ determined using a reachable manifold is greater than a reachability density threshold, wherein the reachable manifold defines whether a set of robot joint angles is kinematically feasible for reaching the specified end effector pose, and where the reachable manifold is determined via training including: based on a set of target robot joint angles, generating a first estimated end effector pose and a first estimated latent variable that is a first intermediate variable between the set of target robot joint angles and the first estimated end effector pose; determining a set of estimated robot joint angles based on (a) the first estimated latent variable and (b) a target end effector pose; determining joint probabilities for the robot based on (a) the first estimated latent variable and (b) the target end effector pose; and based on the set of estimated robot joint angles, determining (a) a second estimated end effector pose and (b) a second estimated latent variable that is a second intermediate variable between the set of estimated robot joint angles and the second estimated end effector pose, where the joint probabilities define the reachable manifold of the end effector of the robot.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein:

FIG. 4 includes example pseudo-code for training forward, inverse, and density networks of the model;

FIG. 9 shows kinematic feasibility validation and direct inverse mapping results;

In the drawings, reference numbers may be reused to identify similar and/or identical elements.

DETAILED DESCRIPTION

Figure 1:
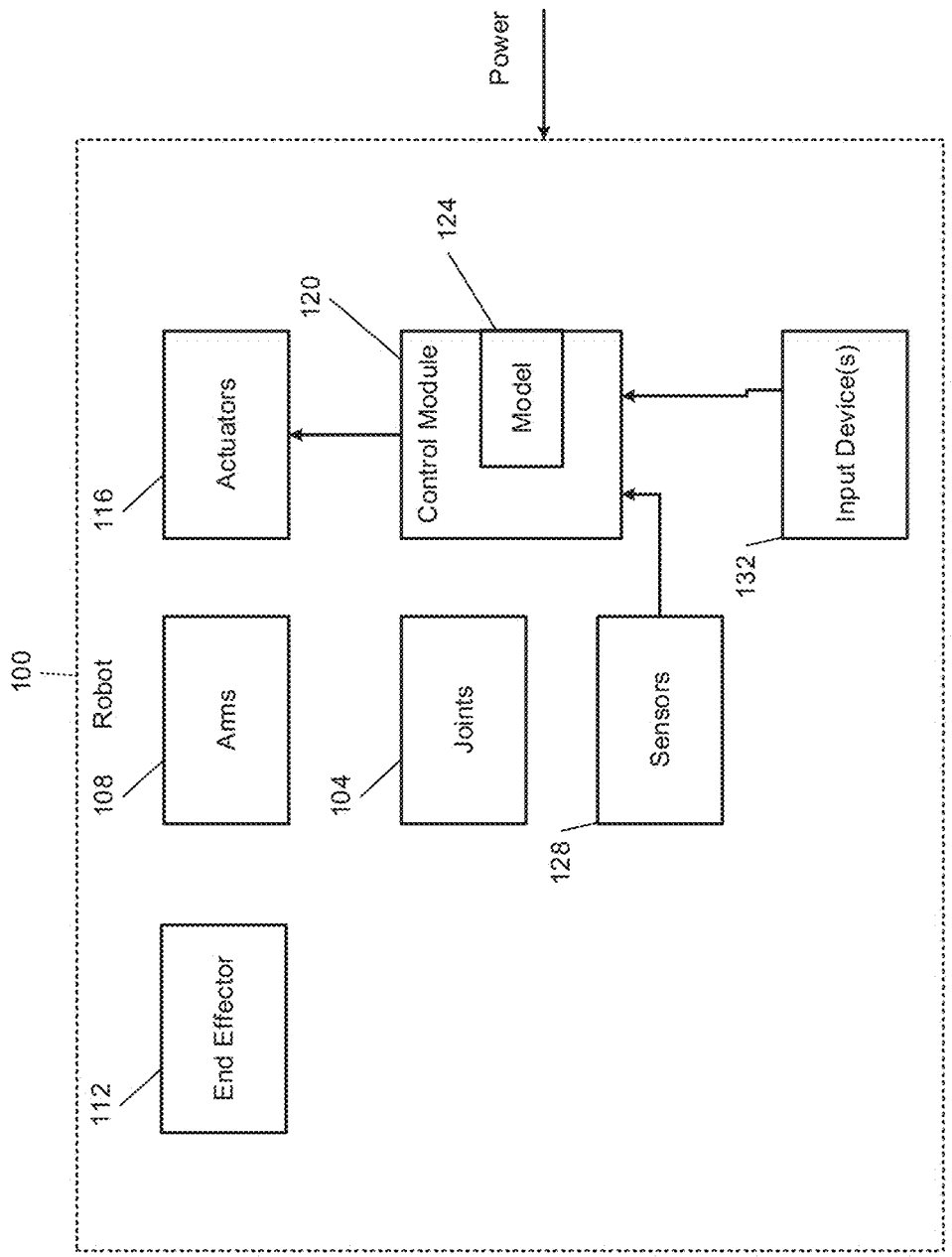
FIG. 1 is a functional block diagram of an example robot.

Robots can be trained to perform tasks in various different ways. For example, a robot can be trained by an expert to perform one task via actuating according to user input to perform the one task. Once trained, the robot may be able to perform that one task over and over as long as changes in the environment or task do not occur.

The present application involves learning a reachable manifold of a robot (i.e., the reachable workspace (poses) of a robot's end effector) and training an inverse network of the model (e.g., a neural network that solves inverse kinematics). In this context, a continuous reachable manifold learning approach is proposed to validate the feasibility of task space motions for a robot manipulator. Having such a reachable manifold in task space is very beneficial in multiple ways. For example, a robot can plan its motion in task space without checking time-consuming iterative feasibility checks along a planned trajectory. Especially, for an action policy learning using reinforcement learning, discarding infeasible action space may reduce the training iterations. As another example, in object grasping tasks, the reachable manifold can provide an instant solution to discard infeasible grasping poses in terms of robot reachability with the respective robot's current base coordinate system. As another example, the reachable manifold can provide a good indication to quantify the richness of solutions to place a robot end effector to a target end-effector pose.

While such a reachable manifold provides a good indication of kinematic feasibility and richness of inverse mapping solutions for a given robot Cartesian space task, configuration space values are computed to control the robot. This involves an inverse mapping problem (e.g., determining reachability on the basis of a target pose) involving mapping from the configuration space to Cartesian space. Some solutions are gradient (e.g., Jacobian) based iterative approaches in the velocity level. Also, the results may be affected by initial joint configurations and null space reference postures for a redundant manipulator.

Various learning approaches can be used. Learning a one-shot inverse mapping problem (to estimate joint configuration without an iterative process for a target pose) for redundant manipulators may be challenging as is a one-to-many mapping. In order to make a robot perform a task in Cartesian space, a set of values in joint configuration space (e.g., joint position, velocity, or torque) needs to be found for the task space trajectory. There may be a large number of possible solutions (in joint configuration space) to put a robot end-effector to a specific pose in task space for a redundant manipulator.

The present application involves determining diverse inverse solutions for a redundant manipulator to place the end-effector in a specific pose. This may be referred to as a multi-modal distribution. A unified learning framework may be used to validate the feasibility and to determine diverse inverse mapping solutions. The models are trained from a dataset generated from robot motor babbling which involves the robot exploring its configuration space densely within its kinematic capability. As a result, the trained models can determine kinematic reachability of a target pose, and its inverse solutions without iterative computation.

Stated differently, the present application involves a unified learning framework to validate kinematic feasibility and to solve inverse mapping for a planned task space motion. The present application also involves a reachability measure for a target pose in the task space without an iterative process. The present application also provides diverse and accurate inverse mapping solutions for a redundant manipulator. As the models are trained accurately using the samples which are generated by considering (and avoiding) self-collision and the joint limit for a robot, the resultant models may not violate self-collision and joint limit constraints.

FIG. 1 is a functional block diagram of an example robot 100. The robot 100 may be stationary or mobile. The robot may be, for example, a 5 degree of freedom (DoF) robot, a 6 DoF robot, a 7 DoF robot, an 8 DoF robot, or have another number of degrees of freedom. In various implementations, the robot 100 may be the Panda Robotic Arm by Franka Emika or another suitable robot.

The robot 100 is powered, such as via an internal battery and/or via an external power source, such as alternating current (AC) power. AC power may be received via an outlet, a direct connection, etc. In various implementations, the robot 100 may receive power wirelessly, such as inductively.

The robot 100 includes a plurality of joints 104 and arms 108. Each arm may be connected between two joints. Each joint may introduce a degree of freedom of movement of an end effector 112 of the robot 100. The end effector 112 may be, for example, a gripper, a cutter, a roller, or another suitable type of end effector. The robot 100 includes actuators 116 that actuate the arms 108 and the end effector 112. The actuators 116 may include, for example, electric motors and other types of actuation devices.

A control module 120 controls the actuators 116 and therefore the actuation of the robot 100 using a trained model 124. The control module 120 may include a planner module configured to plan movement of the robot 100 to perform one or more different tasks. An example of a task includes grasping and moving an object. The present application, however, is also applicable to other tasks. The control module 120 may, for example, control the application of power to the actuators 116 to control actuation. The model 124 and the training of the model 124 is discussed further below.

The control module 120 may control actuation based on measurements from one or more sensors 128, such as using feedback and/or feedforward control. Examples of sensors include position sensors, force sensors, torque sensors, etc. The control module 120 may control actuation additionally or alternatively based on input from one or more input devices 132, such as one or more touchscreen displays, joysticks, trackballs, pointer devices (e.g., mouse), keyboards, and/or one or more other suitable types of input devices.

The robot 100 may have more degrees of freedom than the task and be referred to as a redundant manipulator. For example, the robot 100 may be a 7DoF or higher robot as mentioned above, and the tasks performed by the robot may involve a 6DoF end effector pose (e.g., a 3-D end effector position and a 3-D end effector orientation).

Figure 2:
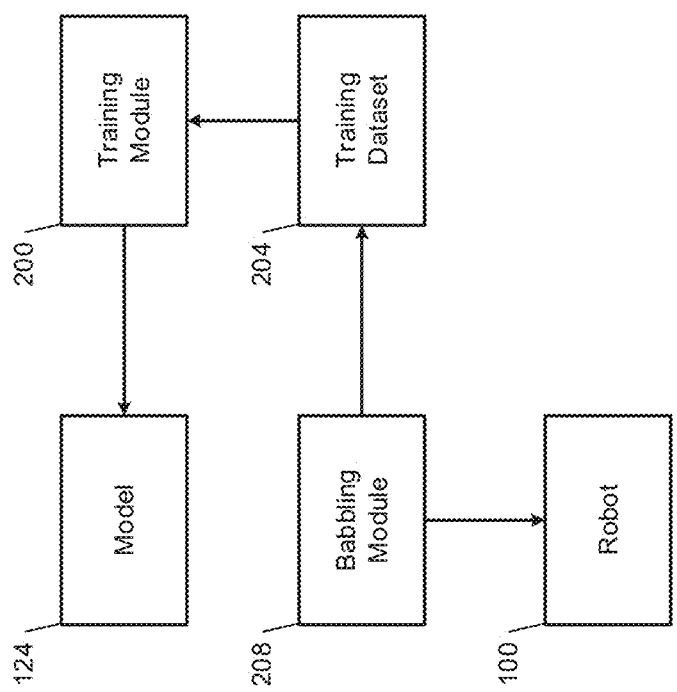
FIG. 2 is a functional block diagram of an example training system.

FIG. 2 is a functional block diagram of an example implementation of a training system. A training module 200 trains the model 124 as discussed further below using a training dataset 204.

A babbling module 208 performs babbling of the robot 100 to generate and store the training dataset 204. The babbling involves actuating the robot 100 randomly to different positions (sets of joint angles). For example, the babbling module 208 may randomly actuate the robot 100 to at least 10 million different positions, 50 million different positions, 100 million different positions, 200 million different positions, or another suitable number of different positions. The babbling to create the training dataset 204 enables the training module 200 to train the model 124 to learn the reachable manifold of the robot 100. The reachable manifold of the robot 100 defines reachable poses of the end effector of the robot 100.

Figure 3:
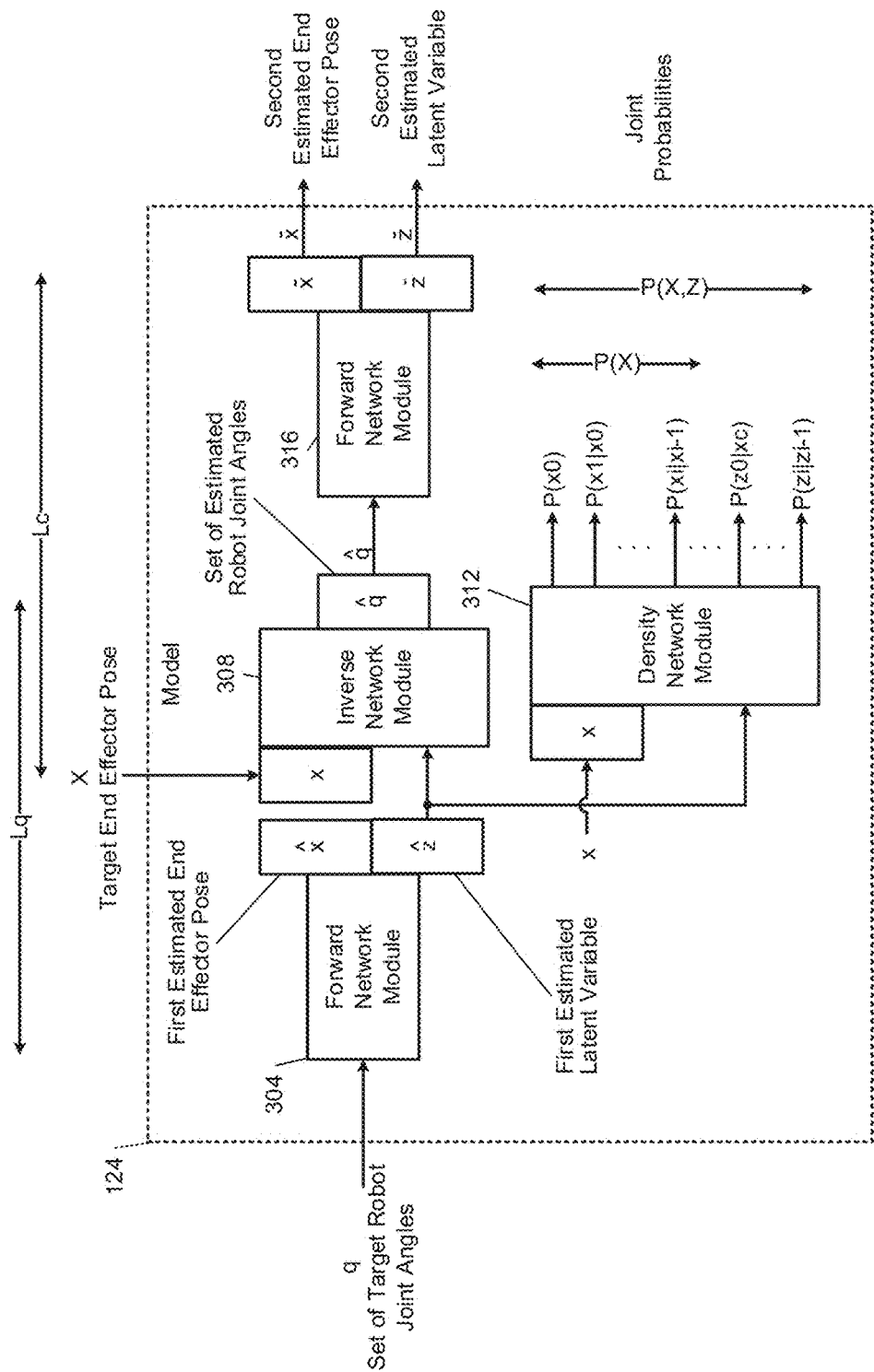
FIG. 3 is a functional block diagram of an example implementation of a model.

FIG. 3 is a functional block diagram of the model 124. The model 124 includes a forward network module 304 (which is also referred to herein as a first forward network module). The forward network module 304 may be a multilayer neural network. The multilayer neural network may be fully connected. The forward network module 304 receives a set of target joint angles of the robot 100. q denotes the target set of joint angles. Based on the target set of joint angles q, the forward network module 304 generates an estimated end effector 6 DoF pose to achieve the target joint angles and a latent variable. $\hat{x}$ denotes the (first) estimated end effector 6 DoF pose. $\hat{z}$ denotes the (first) latent variable.

An end effector 6 DoF pose (x) and the latent variable ($\hat{z}$) are input to an inverse network module 308 and a density network module 312. The inverse network module 308 may be a multilayer neural network. The multilayer neural network may be fully connected. The layers of the inverse network module 308 may be arranged inversely/oppositely to the layers of the forward network module 304. For example, the layers of the forward network module 304 may be arranged in a first order, and the layers of the inverse network module 308 may be arranged in a second order that is opposite the first order. Based on the end effector 6 DoF pose (x) and the latent variable ($\hat{z}$), the inverse network module 308 generates a set of estimated target joint angles 100. The set of estimated target joint angles of the robot 100 are denoted by $\hat{q}$.

Based on the end effector 6 DoF pose (x) and the latent variable ($\hat{z}$), the density network module 312 determines joint probabilities $p(x)$ and $p(x,z)$, such as using the chain rule of probability. The probability density $p(x,z)$ may be used to define a reachable manifold of the end effector 112 of robot 100. The density network module 312 includes an autoregressive flow network, such as a block neural autoregressive flow (B-NAF) network. The B-NAF network may be the BNAF network described in N. De Cao, et al., "Block Neural Autoregressive flow," in *Uncertainty in Artificial Intelligence*, 2019, which is incorporated herein in its entirety, or another suitable type of B-NAF or autoregressive flow network. The B-NAF provides a compact and universal density approximation model. Unlike neural autoregressive flow networks, B-NAFs train the network directly. The density network module 312 may determine the joint probabilities using the equation:

$$p(\xi)=p(\xi_1)\prod_{i=2}p(\xi_i|\xi_{1:i-1})$$

where $p(\xi)$ are the conditional joint probability densities. The chain rule of probability is reflected in the equation above. Each of the conditional joint probability densities is modeled individually using dense networks of the density network module 312. By using a (single) masked autoregressive network in the density network module 312, the conditional joint probability densities are determined efficiently in parallel.

Once trained, the inverse network module 308 and the density network module 312 will be used to control actuation and movement of the robot 100 as described below with reference to FIG. 11. A pose x or [x,z] may be deemed feasible by the control module 120 and used to control actuation of the robot 100 when density $p(x)$ or $p(x,z)$ is greater than a reachability density threshold $\rho_x$ or $\rho_c$, respectively. The planner module of the control module 120 may generate the x and z values to perform a task.

A forward network module 316 (which is also referred to herein as a second forward network module) receives the set of estimated target joint angles of the robot 100 ($\hat{q}$). The forward network module 316 may be a multilayer neural network. The multilayer neural network may be fully connected. The forward network module 316 may include the same network and layer configuration as the forward network module 304. Based on the set of estimated target joint angles $\hat{q}$, the forward network module 316 generates an estimated end effector 6 DoF pose, to achieve the estimated target joint angles $\hat{q}$, and a latent variable. $\bar{x}$ denotes the (second) estimated end effector 6 DoF pose. $\bar{z}$ denotes the (second) latent variable.

For the fully connected forward F neural networks (that includes modules 304 and 316 for estimating an end-effector pose and latent variable (representation) for a set of target joint angles (joint configuration)) and inverse I neural network (that includes module 308 for estimating a set of joint configurations for a target end-effector pose and latent variable), 6 and 9 layers, respectively, may be used. The dimensions of all the hidden layers may be set to 500 or another suitable dimension. The density network module 312 D may include or consist of 4 layers with 66 hidden dimensions.

Referring to FIGS. 2 and 3, the training module 200 may train the model 124 using an Adam optimizer. Example learning rates for the forward and inverse network modules (F and I) 304, 308, and 316 are 0.0001 and 0.005 for the density network module (D) 312. The parameters may be validated through cross-validation.

Since a redundant inverse mapping problem (a one-to-many mapping or under-determined problem) is involved, there may be an infinite number of solutions in the configuration space to place a robot end-effector to a feasible pose. The present application involves use of a latent representation (the latent variable) to encode the diversity of inverse solutions for a target end-effector pose.

The training module 200 trains the model 124 to include a deterministic inverse mapping function $q=I(x, z)$. $z \in \mathbb{R}^K$ represents the latent (space) variable. The forward network module 304 $\{x, z\}=F(q)$ estimates the end effector pose x and the latent representation z for the input joint configuration q. To encode the diversity of the solutions in the latent space, the dimension of the latent variable K should be greater than or equal to the redundant degrees of freedom, $K \geq D-6$.

The inverse network module 308 I estimates a set of joint configurations for a given end-effector pose x and a latent variable z. The density network module 312 $D(x,z)$ estimates joint probability density for the input x and z.

The training module 200 trains the forward and inverse network modules 304, 308, and 316 jointly (together) by minimizing the three loses below with the density network module 312 being fixed.

$\mathcal{L}_q(q, \hat{q})$ is a Joint configuration reconstruction loss $\mathcal{L}_c([x, \hat{z}], [\bar{x}, \bar{z}])$ is an end-effector pose and latent variable reconstruction loss $\mathcal{L}_z = KL(p(z)|\aleph(0, E) + KL(p, x, z)|(p(x)p(z))$ is a latent loss including two losses.

The first loss is that the density of the latent variable z be shaped as a normal distribution. The second loss is that the mutual information between x and z be zero. This loss forces x and z to be independent so that the forward network modules do not encode same information twice in x and z. The training module 200 determines the joint configuration reconstruction loss based on the set of estimated target joint angles of the robot 100 ($\hat{q}$) and the target joint angles (q), for example, using a lookup table or an equation that relates the inputs to loss values. The training module 200 determines the end-effector pose and latent variable reconstruction loss based on the end effector pose x and the latent representation z.

The training module 200 trains the density network module 312 after training the forward and inverse network modules 304, 308, and 316. The forward and inverse network modules 304, 308, and 316 are fixed during the training of the density network module 312.

For the mutual information loss, the training module 200 may use KL divergence, where p(x, z) and p(x) are determined from by the density network module 312 D as discussed above.

The training module 200 may use mean squared error (MSE) to determine $L_q$ and $L_c$. While the example of MSE is provided, the present application is also applicable to other ways of calculating $L_q$ and $L_c$. The training module 200 may determine a total loss based on the losses above, such as based on or equal to a weighted sum of the individual losses, $\mathcal{L} = \Sigma_{l=1}^{L} \lambda_l \mathcal{L}_l$, where $\mathcal{L}$ is the total loss, $\mathcal{L}_l$ are the losses above, and $\lambda_l$ are predetermined weight values associated with the above losses, respectively.

FIG. 4 includes example pseudo-code for training the forward, inverse, and density networks. First, the training dataset 204 $\{x_i, q_i\}_{i=1}^N$, is collected via babbling, as discussed above. Next, the training module 200 trains the forward and inverse network modules 304, 308, and 316 while the density network module 312 is kept fixed. The forward and inverse network modules 304, 308, and 316 function as described above. The density network module 312 determines the p(x), p(x,z) values as described above. The training module 200 determines the losses described above. The training module 200 then performs optimization (e.g., using the Adam optimizer) and adjusts the forward and inverse network modules 304, 308, and 316, to minimize the losses. The training module 200 may determine the joint configuration reconstruction loss Lq and the end-effector pose and latent variable reconstruction loss $L_c$ using MSE. A batch size may be set to 1e5 or another suitable batch size.

Once training of the forward and inverse network modules 304, 308, and 316 is complete (e.g., when the total loss is less than a predetermined value or until a number of epochs have been completed), the training module 200 trains the density network module 312. The training module 200 determines a loss of the density network module 312 $L_d$, such as using KL divergence based on the joint probabilities (the p(x), p(x,z) values). An example equation for determining the loss of the density network module 312 $L_d$ is $\mathcal{L}_d = KL(p_s(x,z)|p(x,z))$, which involves the KL divergence between the source distribution $p_s(x,z)$ of the training samples and the target distribution p(x,z) of the density network module D.

The training module 200 then performs optimization (e.g., using the Adam optimizer) and adjusts the density network module 312 to minimize the loss of the density network module 312 $L_d$.

Figure 5:
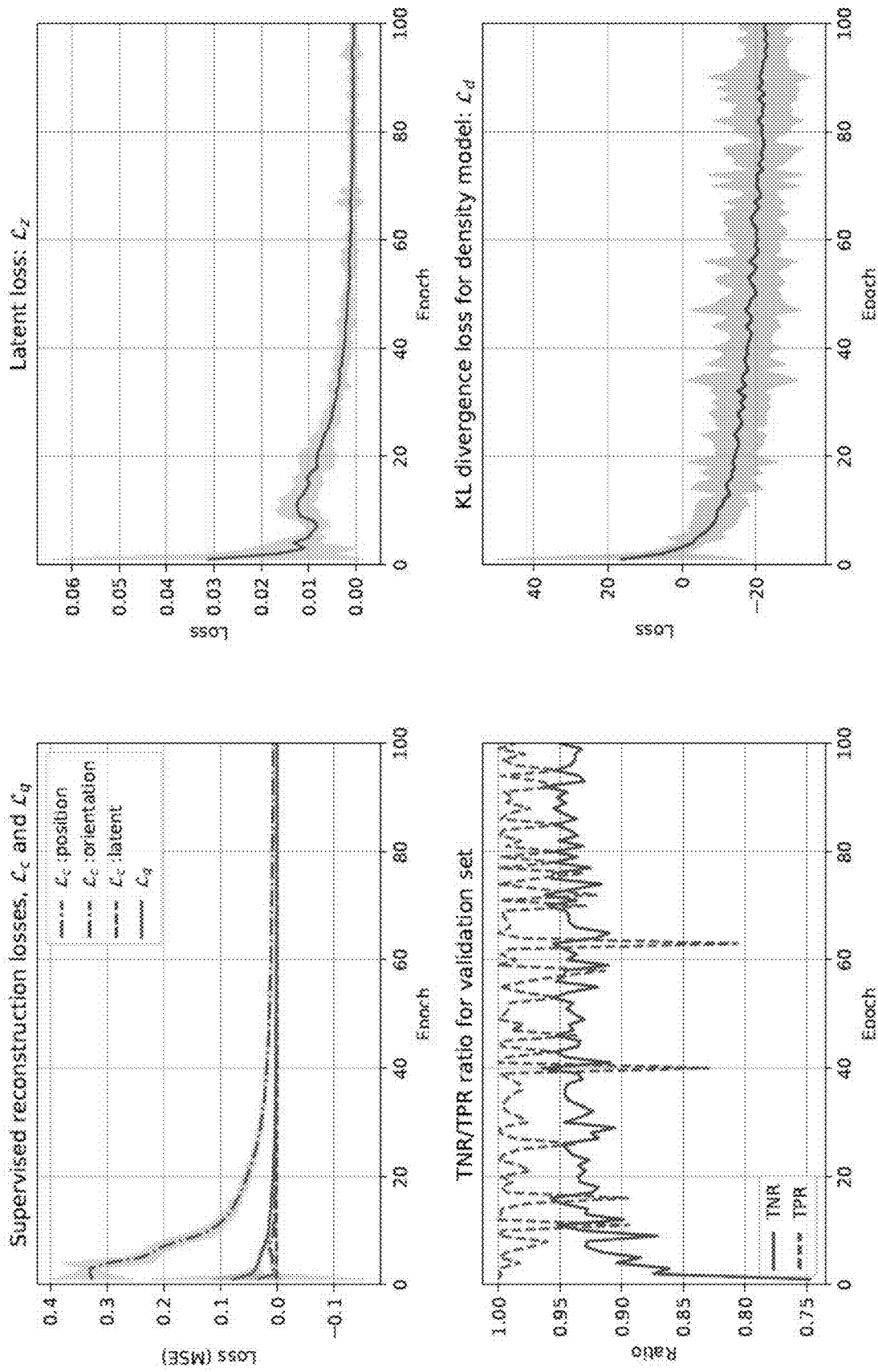
FIG. 5 includes an example graph of loss curves determined from testing.

FIG. 5 includes an example graph of loss curves determined from the testing from testing and validation sets. The supervised losses $L_q$ and $L_c$ (left top), latent loss Lz (right top) and density loss $L_d$ (right bottom) are computed by the training module 200 using the testing set for each epoch. The left bottom graph of FIG. 5 illustrates the density model accuracy curve (true positive rate (TPR) and true negative rate (TNR)) which is computed by the training module 200 using the validation set.

The reachable density threshold $p_x$ may be selected, such as 99% of training samples to be above the threshold at every epoch. The threshold is used at the next epoch to compute a true positive rate (TPR) and a true negative rate (TNR). After the training is completed, experimental results provided a TPR and TNR of 0.99 and 0.95 respectively.

Training samples $\{x_i, q_i\}_{i=1}^N$ of the training dataset 204 are collected via babbling, as discussed above, by randomly sampling joint configurations $\hat{q}$ within the joint ranges of the robot 100. The resulting end-effector poses x are determined by the training module 200 from the predetermined forward kinematics.

The training module 200 may also verify that self collisions of the robot 100 do not occur and discard training samples including self collisions of the robot 100 (collisions of the robot 100 with itself). The training dataset 204 may include a total of 1e8 training samples or another suitable number of training samples. A predetermined percentage (e.g., 80%) of the training samples may be randomly selected and used for the training. The remainder of the training samples may be used for testing.

For a validation dataset, kinematically infeasible samples may also be generated. Generating infeasible samples may involve a more complicated process than the feasible sample generation, as the samples may be validated analytically or probabilistically.

A pose in Cartesian space may be randomly selected within the limited position envelope (1.5<x, y, and z<1.5 unit: m). An orientation may be randomly selected but without any restrictions. The sampling space may include the whole reachable space of the robot 100 with some margin of difference.

Each pose may be tested by solving the inverse kinematics to validate its feasibility. A general Jacobian-based IK (inverse kinematics) solver based on Newton-Raphson iterations may be used. As the initial choice of joint angles affects the solution, for each target pose, 200 different initial joint angles may be chosen (e.g., randomly) within the joint ranges of the robot 100. A maximum number of iterations for the IK solver may be set to, for example, 200 or another suitable number. If all IK solver attempts are failed within the iteration limit, the pose may be considered as a negative (infeasible) and otherwise positive (feasible). For an example of 1e5 samples, 6.8% may be determined to be feasible and 93.2% may be determined to be infeasible.

Figure 6:
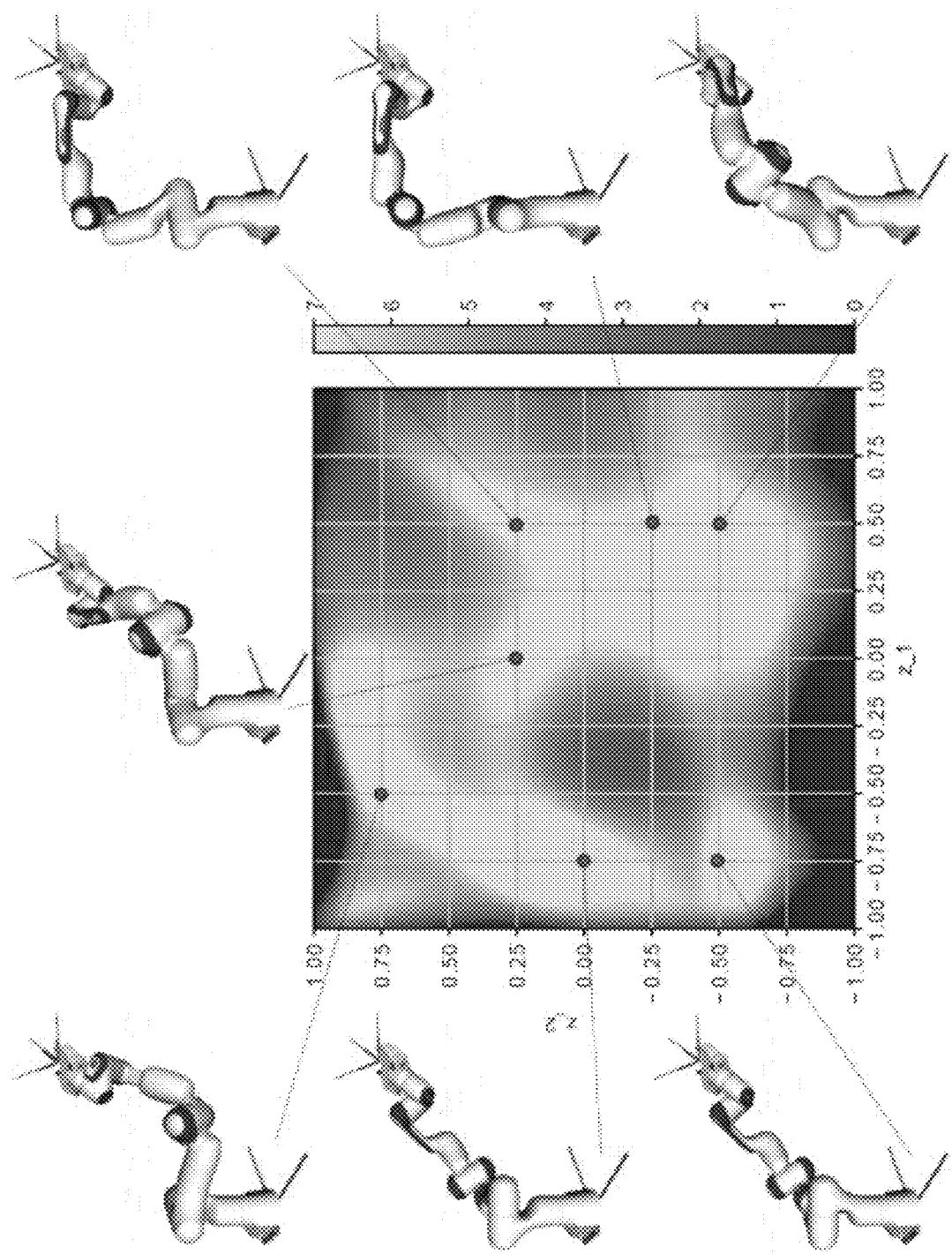
FIG. 6 includes a probability density plot determined by a trained density network module on latent space in log scale.

FIG. 6 includes a probability density p(x,z) plot determined by the trained density network module 312 on latent space in log scale. An example end-effector pose in the testing set is set as a target pose: position (0.200, 0.58, 0.77) and orientation (−0.30, −0.30, −0:63, 0.65) in scalar-last format of unit Quaternion. Seven latent variables were tested with the trained inverse network module 308. Seven example possible joint configurations to achieve the example end-effector pose are displayed. The inverse network module 308 generates diverse solutions in joint configuration space for the target end-effector pose.

Figure 7:
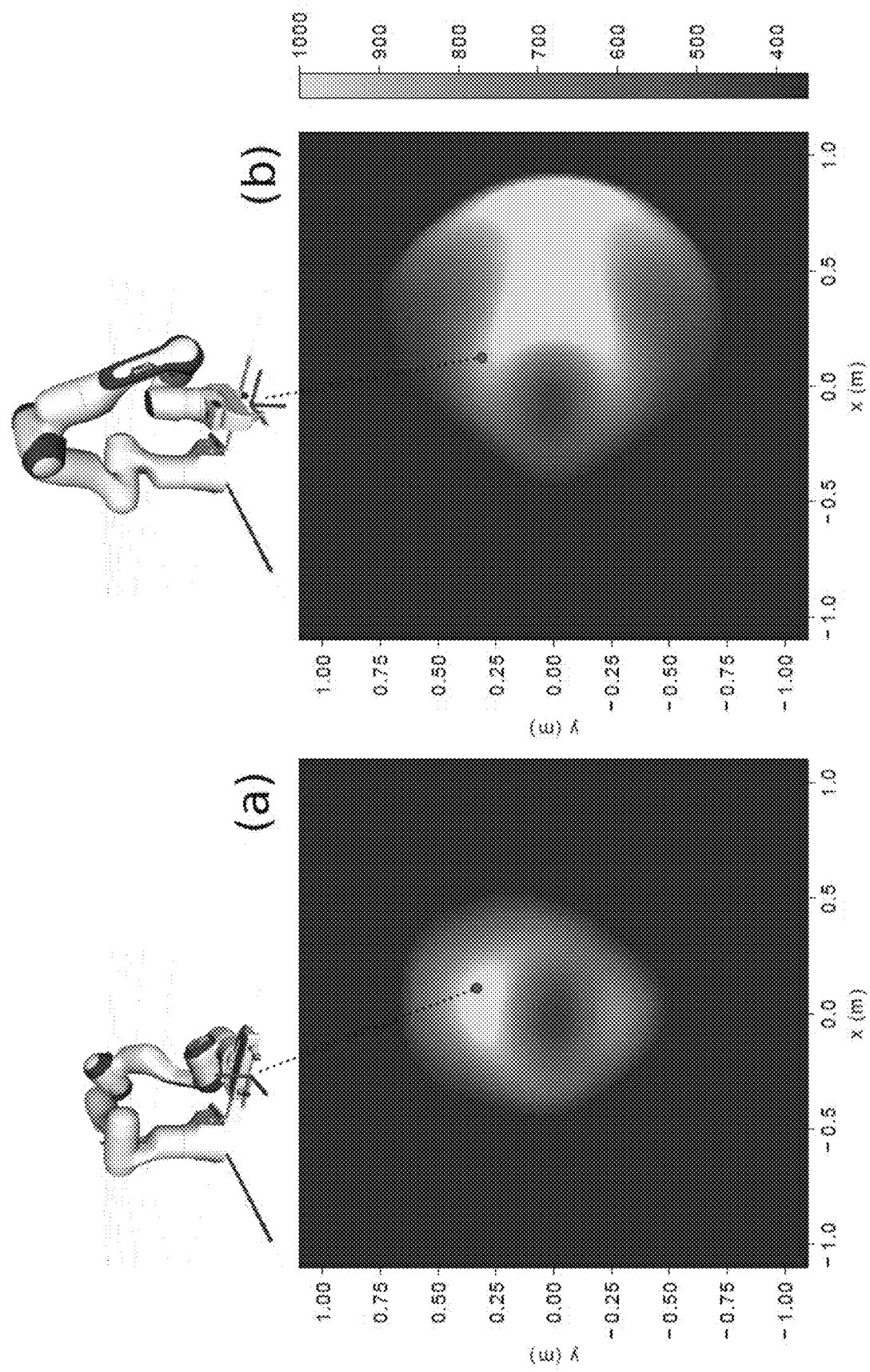
FIG. 7 includes two example portions of a reachable density model in 2D (x-y plane)

The reachable density model has high dimensionality. Displaying the reachable density model in 2D (2 dimensionally) or 3D (three dimensionally) is therefore difficult. FIG. 7 includes two example portions (e.g., cross-sections) of the reachable density model in 2D (x-y plane) by fixing the other values arbitrary. FIG. 7 illustrates that different orientation constraints may affect the reachable space in the x-y position plane.

To check if the resultant inverse mapping solutions from the inverse network module 308 include self-colliding samples, the inverse solutions of the testing set may be evaluated using a library.

For a task that requires high resolution, the inverse network module 308 may also perform a refinement process on the resultant inverse mapping solution. The refinement process may include the inverse network module 308 performing one, two, or more than two iterations of a Jacobian based IK approach. Initial and rest joint configurations are set with the output of the inverse network module 308.

Figure 8:
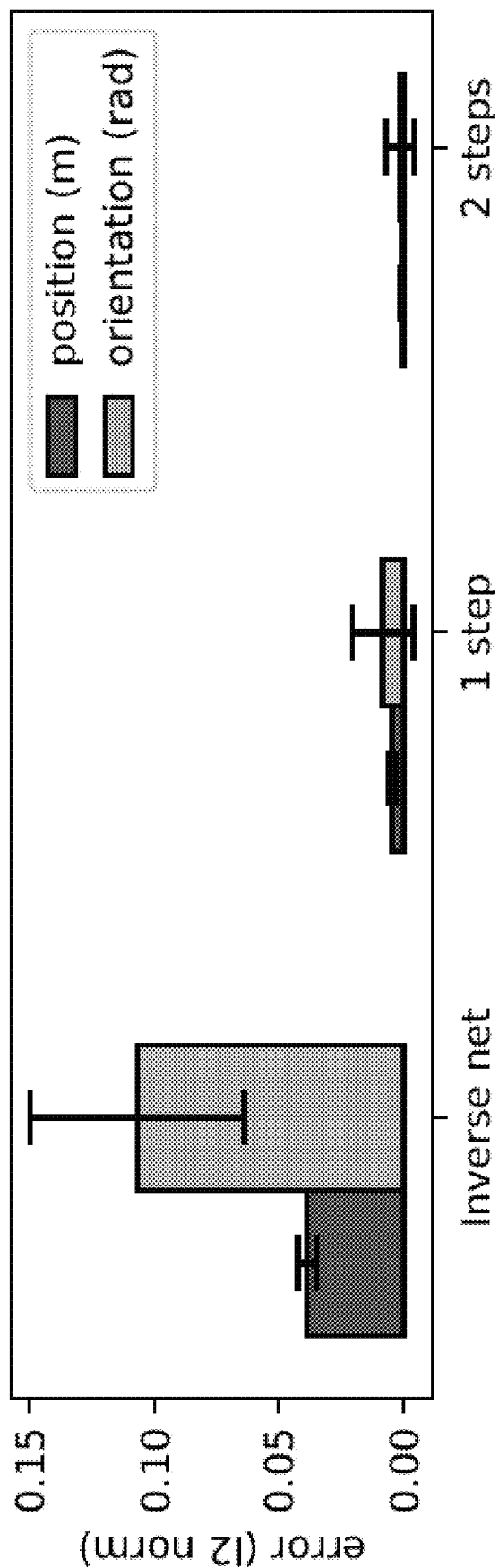
FIG. 8 includes graphs of error with and without refinement.

FIG. 8 illustrates that error in the output of the inverse network module 308 (without any iterations of the IK approach), with one iteration (1 step) of the IK approach, and two iterations (2 steps) of the IK approach. FIG. 8 illustrates that the refinement process helps to reduce the remaining end-effector pose error.

For the task of grasping an object, diverse robot hand poses with respect to the object coordinate system could be used. Deciding how to select an optimal grasping configuration among the diverse robot hand poses, however, highly depends on the target task and kinematic feasibility for the robot. Kinematic feasibility validation may also be needed for successful grasping. The above, however, is a time consuming process and has a risk of falling on local optima.

By way of contrast, the present application directly provides the kinematic feasibility and corresponding joint configurations together without the iterative process.

FIG. 9 shows kinematic feasibility validation and direct inverse mapping results of the present application. Among the diverse grasping poses for the object, the 10 best grasping candidates are illustrated visually. The density network module 312 D evaluates the candidates in terms of kinematic feasibility, and the inverse network module 308 I generates robot joint configurations for the gripper poses (latent variable are set as [0,0]). As shown in FIG. 9, the density network module 312 D directly discards the grasp configurations that are kinematically infeasible for the robot 100. Green illustrates kinematically feasible poses, while grey illustrates kinematically infeasible poses. The present application eliminates infeasible poses (left robot illustrations) without trying them and moves directly to a feasible pose (right robot illustrations) without first attempting one or more infeasible poses.

Figure 10:
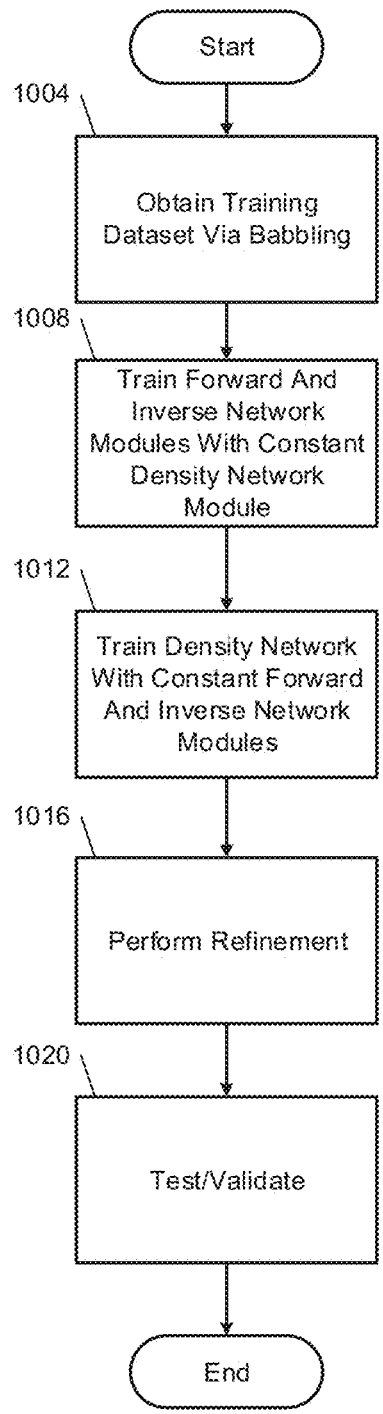
FIG. 10 is a flowchart depicting an example method of training the model.

FIG. 10 is a flowchart depicting an example method of training the model 124. Control begins with 1004 where the training module 200 obtains the training dataset 204 via babbling, as discussed above. At 1008, the training module 200 trains the forward and inverse network modules 304, 308, and 316 while holding constant the density network module 312. The training module 200 determines the losses Lq, Lc, and Lz as discussed above and adjusts one or more parameters of the forward and inverse network modules 304, 308, and 316 to minimize the losses Lq, Lc, and Lz.

At 1012, the training module 200 trains the density network module 312 while holding constant the forward and inverse network modules 304, 308, and 316. The training module 200 determines the loss Ld as discussed above and adjusts one or more parameters of the density network module 312 to minimize the loss Ld. The model 124 is then trained. Optionally, the training module 200 may perform the refinement process at 1016, such as involving one or more iterations of the IK process.

At 1020, the training module 200 may perform validation and/or testing to validate and/or test the trained model 124.

Figure 11:
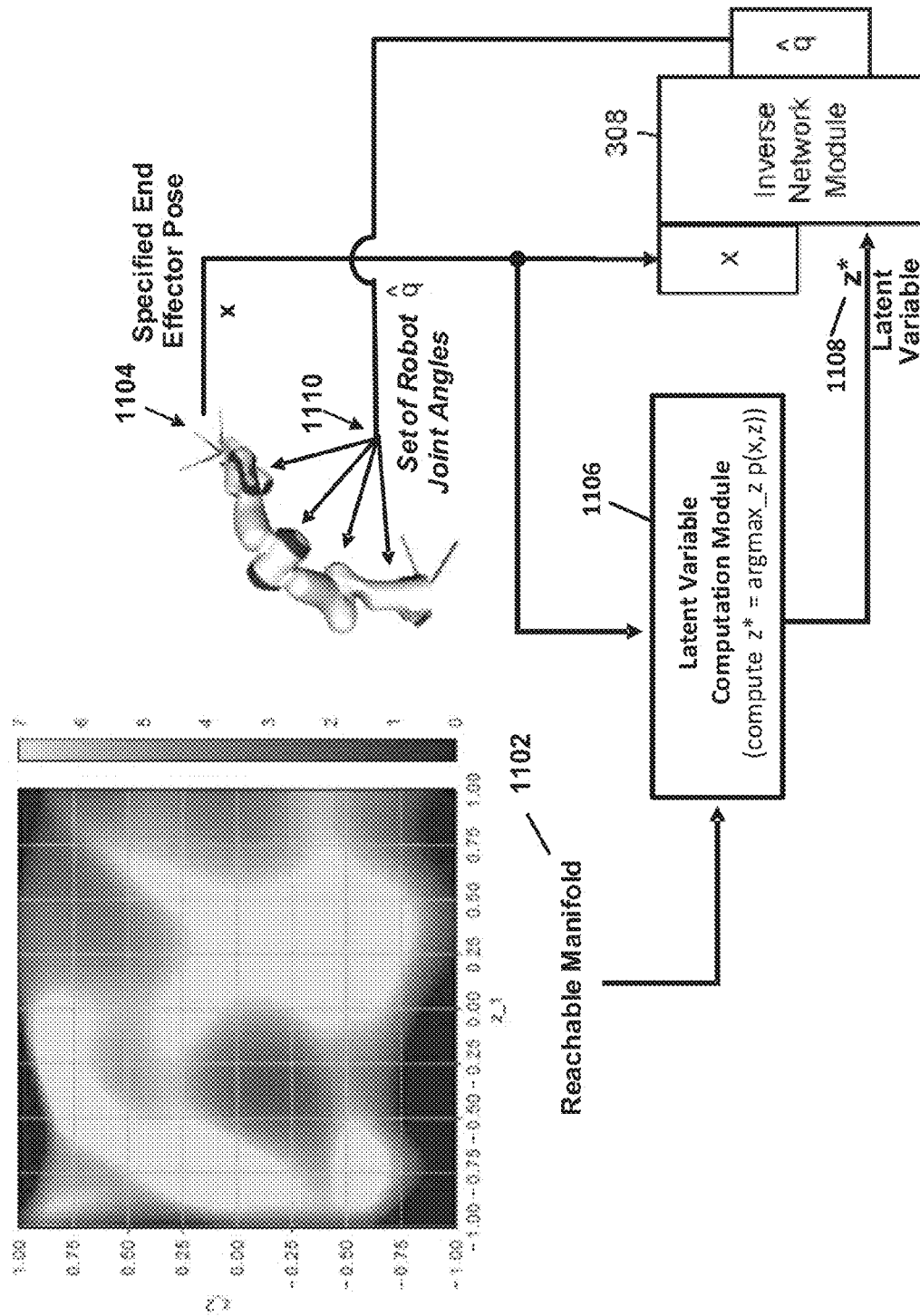
FIG. 11 is a functional block diagram of a runtime implementation that uses the inverse network module trained as shown in FIG. 3 to determine a set of robot joint angles for a specified robot end effector pose.

FIG. 11 is an example runtime implementation for the model trained in FIG. 3. In one embodiment, the runtime implementation in FIG. 11 forms part of a planner module of the control module 120 shown in FIG. 1. FIG. 11 is a functional block diagram of an example runtime implementation that uses the inverse network module 308 and the density network module 312 that are trained using the model shown in FIG. 3.

A reachable manifold (i.e., reachable density model) 1102, which may be used to determine feasibility of motions of a set of joint angles of the end effector 112 of the robot 100, is produced using the trained density network module 312. A specified end effector pose 1104 may be deemed feasible when density p(x) or p(x,z) determined using the reachable manifold 1102 is greater than a reachability density threshold $\rho_x$ or $\rho_c$, respectively. In addition, a latent variable computation module 1106 may be used to determine a value for latent variable 1108 associated with the specified end effector pose 1104 by computing the arguments of the maxima of the probability density p(x,z) (i.e., z*=argmax_z p(x,z)). The latent variable 1108 represents a compact statement of a joint configuration (i.e., an intermediate variable between the specified end effector pose x and the set of estimated joint angles q). A set of robot joint angles

1110 may be determined by the trained inverse network module 308 based on the specified end effector pose 1104 and the latent variable 1108.

Presented above is a unified learning framework to validate the feasibility of a desired end-effector pose for a robot manipulator for path/motion planning. Also discussed is an approach to model diverse inverse mapping solutions. The above directly provides the kinematic feasibility and diverse inverse solutions for a given task space target without iterative process in the execution stage. Compared to an iterative gradient based approach for solving inverse kinematics, the systems and methods provided herein provide kinematic feasibility and inverse solutions without iterative optimization. Hence the systems and methods described herein are more computationally efficient and can reduce the risk of falling in a local minima. In addition, the training described herein uses samples which are generated by considering self-collision and the trained model avoids self-collision.

The presented latent representation is conceptually similar to a null-space motion of Jacobian in inverse kinematics in robotics. However, the presented approach has minimum representation in the latent space, and directly provides a joint position space solution rather than the local velocity space.

For a task that requires high accuracy, the refinement process discussed above can be applied optionally to decrease end-effector pose error.

The foregoing description is merely illustrative in nature and is in no way intended to limit the disclosure, its application, or uses. The broad teachings of the disclosure can be implemented in a variety of forms, including any additional teachings found in the article by Seungsu Kim and Julien Perez entitled "Learning Reachable Manifold and Inverse Mapping for a Redundant Robot manipulator", published in IEEE International Conference on Robotics and Automation 2021 (ICRA), which is incorporated herein by reference in its entirety. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for training a neural network to control movement of an end effector of a robot, the system comprising:
   a first forward network module configured to, based on a set of target robot joint angles, generate a first estimated end effector pose and a first estimated latent variable that is a first intermediate variable between the set of target robot joint angles and the first estimated end effector pose;
   an inverse network module configured to determine a set of estimated robot joint angles based on (a) the first estimated latent variable and (b) a target end effector pose;
   a density network module configured to determine joint probabilities for the robot based on (a) the first estimated latent variable and (b) the target end effector pose; and
   a second forward network module configured to, based on the set of estimated robot joint angles, determine (a) a second estimated end effector pose and (b) a second estimated latent variable that is a second intermediate variable between the set of estimated robot joint angles and the second estimated end effector pose,
   wherein the joint probabilities define a reachable manifold of the end effector of the robot, and
   wherein the reachable manifold defines whether a set of robot joint angles is kinematically feasible for reaching an end effector pose.

2. The system of claim 1 wherein the first forward network module includes a multilayer neural network.

3. The system of claim 2 wherein the multilayer neural network is fully connected.

4. The system of claim 1 wherein the inverse network module includes a multilayer neural network.

5. The system of claim 4 wherein the multilayer neural network is fully connected.

6. The system of claim 1 wherein:
   the first forward network module includes a first plurality of layers; and
   the inverse network module includes a second plurality of layers that are arranged inversely to the first plurality of layers.

7. The system of claim 1 wherein the density network module includes an autoregressive flow network.

8. The system of claim 7 wherein the autoregressive flow network includes a block neural autoregressive flow (B-NAF) network.

9. The system of claim 1 wherein the density network determines the joint probabilities using the chain rule of probability.

10. The system of claim 1 further comprising a training module configured to:
    while maintaining the density network module constant, jointly train the first forward network module, the second forward network module, and the inverse network module; and
    while maintaining the first forward network module, the second forward network module, and the inverse network module constant, training the density network module.

11. The system of claim 10 wherein the training module is configured to train the first forward network module, the second forward network module, the inverse network module, and the density network module using samples obtained during babbling of the robot.

12. The system of claim 10 wherein the training module is configured to:
    determine a loss based on the set of target robot joint angles and the set of estimated robot joint angles; and
    while maintaining the density network module constant, jointly train the first forward network module, the second forward network module, and the inverse network module to minimize the loss.

13. The system of claim 12 wherein the training module is configured to determine the loss using mean squared error.

14. The system of claim 10 wherein the training module is configured to:
    determine a loss based on (a) the first estimated latent variable, (b) the target end effector pose, (c) the second set of robot joint angles, and (d) the second estimated latent variable; and
    while maintaining the density network module constant, jointly train the first forward network module, the second forward network module, and the inverse network module to minimize the loss.

15. The system of claim 14 wherein the training module is configured to determine the loss using mean squared error.

16. The system of claim 10 wherein the training module is configured to:
    determine a loss based on the joint probabilities for the robot; and while maintaining the density network module constant, jointly train the first forward network module, the second forward network module, and the inverse network module to minimize the loss.

17. The system of claim 16 wherein the training module is configured to determine the loss using KL divergence.

18. The system of claim 10 wherein the training module is configured to:
determine a first loss based on the set of target robot joint angles and the set of estimated robot joint angles;
determine a second loss based on (a) the first estimated latent variable, (b) the target end effector pose, (c) the second set of robot joint angles, and (d) the second estimated latent variable;
determine a third loss based on the joint probabilities for the robot;
determine a fourth loss based on the first, second, and third losses; and
while maintaining the density network module constant, jointly train the first forward network module, the second forward network module, and the inverse network module to minimize the fourth loss.

19. The system of claim 18 wherein the training module is configured to determine the fourth loss based on:
(a) a first product of the first loss and a first predetermined weight;
(b) a second product of the second loss and a second predetermined weight; and
(c) a third product of the third loss and a third predetermined weight.

20. The system of claim 19 wherein the training module is configured to determine the fourth loss based on the first product plus the second product plus the third product.

21. The system of claim 10 wherein the training module is configured to:
determine a loss based on the joint probabilities for the robot; and
while maintaining the first forward network module, the second forward network module, and the inverse network module constant, training the density module to minimize the loss.

22. The system of claim 21 wherein the training module is configured to determine the loss using KL divergence.

23. A system to control movement of an end effector of a robot, the system comprising:
a latent variable computation module configured to, based on a reachable manifold and a specified end effector pose, determine a computed latent variable that is a first intermediate variable between a set of computed robot joint angles and the specified end effector pose; and
a trained inverse network module configured to, based on the specified end effector pose and the computed latent variable, determine the set of computed robot joint angles;
wherein computed joint probabilities define the reachable manifold of the end effector of the robot; and
wherein the reachable manifold defines whether the set of computed robot joint angles is kinematically feasible for reaching the specified end effector pose;
wherein the trained inverse network module is trained by a training system comprising:
a first forward network module configured to, based on a set of target robot joint angles, generate a first estimated end effector pose and a first estimated latent variable that is a second intermediate variable between the set of target robot joint angles and the first estimated end effector pose;
a density network module configured to determine joint probabilities for the robot based on (a) the first estimated latent variable and (b) a target end effector pose;
and a second forward network module configured to, based on a set of estimated robot joint angles, determine (a) a second estimated end effector pose and (b) a second estimated latent variable that is a third intermediate variable between the set of estimated robot joint angles and the second estimated end effector pose,
wherein during training the inverse network module is configured by the training system to determine the set of estimated robot joint angles based on (a) the first estimated latent variable and (b) the target end effector pose.

24. A system to control movement of an end effector of a robot, the system comprising:
a control module configured to determine feasibility of a specified end effector pose of the robot when density $p(x)$ or $p(x,z)$ determined using a reachable manifold is greater than a reachability density threshold; wherein the reachable manifold defines whether a set of robot joint angles is kinematically feasible for reaching the specified end effector pose,
wherein the reachable manifold is determined with a training system comprising:
a first forward network module configured to, based on a set of target robot joint angles, generate a first estimated end effector pose and a first estimated latent variable that is a first intermediate variable between the set of target robot joint angles and the first estimated end effector pose;
an inverse network module configured to determine a set of estimated robot joint angles based on (a) the first estimated latent variable and (b) a target end effector pose;
a density network module configured to determine joint probabilities for the robot based on (a) the first estimated latent variable and (b) the target end effector pose; and
a second forward network module configured to, based on the set of estimated robot joint angles, determine (a) a second estimated end effector pose and (b) a second estimated latent variable that is a second intermediate variable between the set of estimated robot joint angles and the second estimated end effector pose,
wherein the joint probabilities define the reachable manifold of the end effector of the robot.

25. A method of training a neural network to control movement of an end effector of a robot, the method comprising:
based on a set of target robot joint angles, generating a first estimated end effector pose and a first estimated latent variable that is a first intermediate variable between the set of target robot joint angles and the first estimated end effector pose;
determining a set of estimated robot joint angles based on (a) the first estimated latent variable and (b) a target end effector pose;
determining joint probabilities for the robot based on (a) the first estimated latent variable and (b) the target end effector pose; and
based on the set of estimated robot joint angles, determining (a) a second estimated end effector pose and (b) a second estimated latent variable that is a second intermediate variable between the set of estimated robot joint angles and the second estimated end effector pose, wherein the joint probabilities define a reachable manifold of the end effector of the robot, and wherein the reachable manifold defines whether a set of robot joint angles is kinematically feasible for reaching an end effector pose.

26. A method of controlling movement of an end effector of a robot, the method comprising:

based on a reachable manifold and a specified end effector pose, determining a computed latent variable that is a first intermediate variable between a set of computed robot joint angles and the specified end effector pose; and based on the specified end effector pose and the computed latent variable, determining the set of computed robot joint angles, wherein computed joint probabilities define the reachable manifold of the end effector of the robot, and wherein the reachable manifold defines whether the set of computed robot joint angles is kinematically feasible for reaching the specified end effector pose;

wherein the set of computed robot joint angles is determined using a neural network trained by:

generating, based on a set of target robot joint angles, a first estimated end effector pose and a first estimated latent variable that is a first intermediate variable between the set of target robot joint angles and the first estimated end effector pose;

determining a set of estimated robot joint angles based on (a) the first estimated latent variable and (b) a target end effector pose;

determining joint probabilities for the robot based on (a) the first estimated latent variable and (b) the target end effector pose; and determining, based on the set of estimated robot joint angles, (a) a second estimated end effector pose and (b) a second estimated latent variable that is a second intermediate variable between the set of estimated robot joint angles and the second estimated end effector pose.

27. A method of controlling movement of an end effector of a robot, the method comprising:

determining feasibility of a specified end effector pose of the robot when density $p(x)$ or $p(x,z)$ determined using a reachable manifold is greater than a reachability density threshold, wherein the reachable manifold defines whether a set of robot joint angles is kinematically feasible for reaching the specified end effector pose, and wherein the reachable manifold is determined via training including:

based on a set of target robot joint angles, generating a first estimated end effector pose and a first estimated latent variable that is a first intermediate variable between the set of target robot joint angles and the first estimated end effector pose;

determining a set of estimated robot joint angles based on (a) the first estimated latent variable and (b) a target end effector pose;

determining joint probabilities for the robot based on (a) the first estimated latent variable and (b) the target end effector pose; and based on the set of estimated robot joint angles, determining (a) a second estimated end effector pose and (b) a second estimated latent variable that is a second intermediate variable between the set of estimated robot joint angles and the second estimated end effector pose, wherein the joint probabilities define the reachable manifold of the end effector of the robot.

* * * * *